May 1, 1923.
J. BLANKENBURG
1,453,584
DEVICE FOR AMPLIFYING TELEPHONE CURRENTS AND OTHER ELECTRIC OSCILLATIONS
Filed June 17, 1919   2 Sheets-Sheet 1
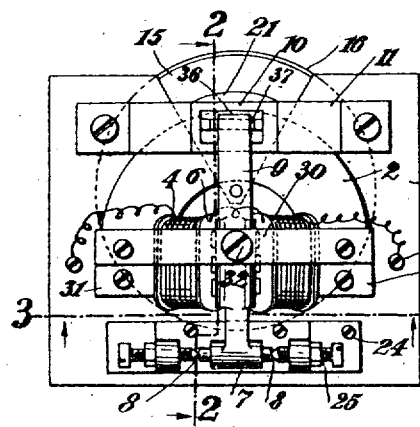
*Fig. 1.*
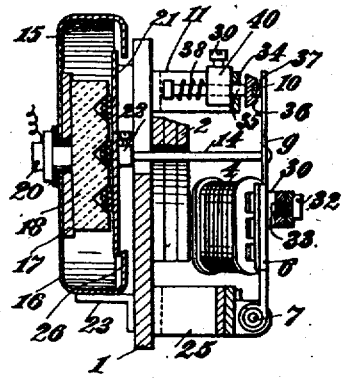
*Fig. 2.*
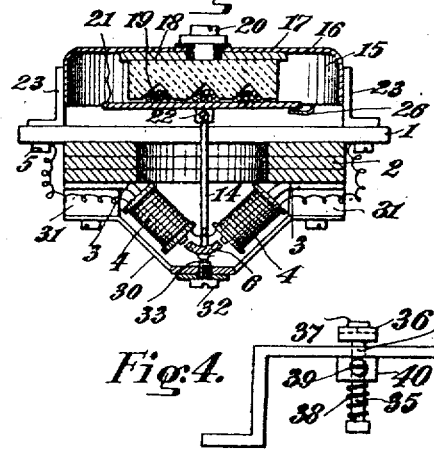
*Fig. 3.*
*Fig. 4.*
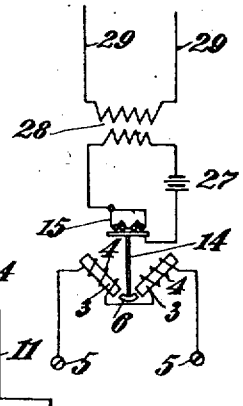
*Fig. 8.*
INVENTOR
JOHANNES BLANKENBURG
BY
ATTORNEYS May 1, 1923. 1,453,584
J. BLANKENBURG
DEVICE FOR AMPLIFYING TELEPHONE CURRENTS AND OTHER ELECTRIC OSCILLATIONS
Filed June 17, 1919   2 Sheets-Sheet 2
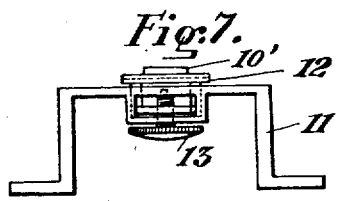
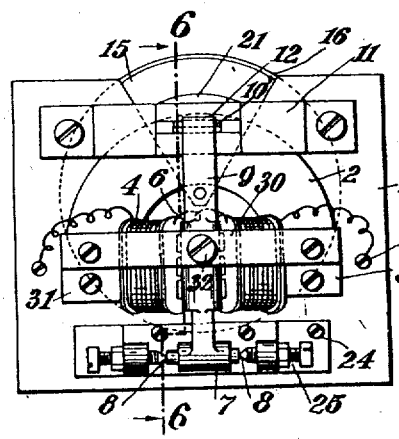 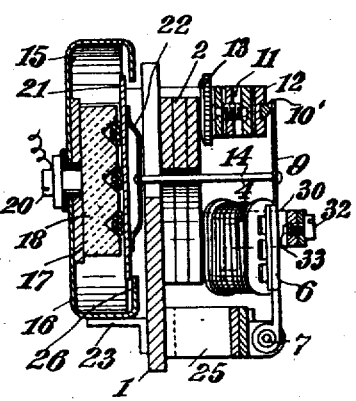
INVENTOR
JOHANNES BLANKENBURG
BY
ATTORNEYS Patented May 1, 1923.

1,453,584

UNITED STATES PATENT OFFICE.

JOHANNES BLANKENBURG, OF BERLIN, GERMANY, ASSIGNOR, BY MESNE ASSIGNMENTS, TO NAAMLOOZE VENNOOTSCHAP FINANZIEELE MAATSCHAPIJ "DRIEBERGEN," OF AMSTERDAM, NETHERLANDS, A COMPANY OF THE NETHERLANDS.

DEVICE FOR AMPLIFYING TELEPHONE CURRENTS AND OTHER ELECTRIC OSCILLATIONS.

Application filed June 17, 1919. Serial No. 304,966.

*To all whom it may concern:*

Be it known that I, JOHANNES BLANKENBURG, residing at Berlin, Germany, have invented certain new and useful Improvements in Devices for Amplifying Telephone Currents and Other Electric Oscillations, of which the following is a specification.

The present invention relates to an arrangement for amplifying telephone currents and other electric oscillations in which the armature of a magnetic system, the magnetic field of which is varied by the said electric oscillations, is coupled to a microphone. The new arrangement differs from the similar arrangements heretofore disclosed essentially in the arrangement of the armature and its coupling with the movable electrode of the microphone, which likewise is disposed in a novel manner. Further novel features, which consist in the combination of various arrangements, will become apparent from the following specification.

The invention has been exemplified in a constructional form in Fig. 1 of the accompanying drawings. Fig. 2 is a section along the line 2—2 of Fig. 1. Fig. 3 is a section along the line 3—3 of Fig. 1. Fig. 4 is a detailed view of the abutment in front elevation. Figs. 5 and 6 disclose a modified form of Figs. 1 and 2, Fig. 6 being a section on line 6—6 of Fig. 5. Fig. 7 shows the abutment corresponding to Fig. 4 in front elevation according to the modification shown in Figs. 5 and 6. Fig. 8 is a plan of the connections preferable for the new arrangement.

On the underside of a baseplate 1 is fitted, as in a telephone receiver, a magnetic magazine consisting of three permanent magnets 2. To the pole ends are fitted in known manner pole shoes 3 which are bent at an acute angle in such a manner that the pole surfaces converge. Each of these pole shoes is fitted with an electro-magnetic coil 4, the windings of which are connected with each other on one side, and at the other side are connected to the terminals 5. Between the pole surfaces is disposed the armature 6, which is made relatively thick and stiff (rigid), and of such a shape that it forms a very short bridge for the lines of force from the one to the opposite pole. The armature thus extends transversely of the lines of force proceeding from pole to pole and is supported at two points, like a beam loaded between its points of support. The two supports are, however, differently constructed, the one at 7 being a hinge bearing, on which the armature may turn freely and without any transverse motion being produced, while the other point is in the form of an abutment against which the armature bears through the medium of a tongue 9. The hinge bearing is composed of a bracket 25 in which the boss 7 of the armature is supported by means of center screws 8. At the other end the tongue 9, made of a more or less elastic material, is fitted, which tongue will, under influence of a magnetic attraction of the armature toward the poles, bear against an abutment 10.

This abutment 10 is fitted to a bracket 11, at the top of which a rod 35 is fitted into a bore 34. This rod has at its one end a fitting 36 adapted to receive a pad 37 of a suitable elastic material such as rubber, leather, felt or the like, which is dovetailed therein. Against this pad 37 bears the tongue 9 of the armature 6. For allowing adjustment of the armature relatively to the pole surface, the abutment itself is made adjustable. This adjustability of the armature may be obtained in any suitable manner. In the arrangement shown in the drawing, the position of the rod may be varied by means of a coiled spring 38 and a set screw 39 fitted in a collar 40 secured to bracket 11, whereby the armature may be set relatively to the pole surfaces. In place of the elastic pad 37, a knife edge may be employed as an abutment, as shown in Figs. 5, 6 and 7. As may be seen from Fig. 7, the knife edge 10 is dovetailed to a small plate 12. This plate 12 may be adjusted in a guide on the bracket 11 in a parallel sense so as to vary the width of the gap between the armature and the poles. The adjustment may be secured by means of a screw 13. To the armature 6 is fitted a rod 14 which extends through the base plate 1 and forms the coupling between the magnetic system just described and the microphone 15 arranged on the other side of the base plate 1. This microphone is so supported by means of several brackets 23 that it is turned with its movable electrode toward the base plate 1. It may consist in known manner of a box 16, to the bottom of which a carbon block 18 is secured, insulated therefrom by means of an intermediate disc 17 of insulating material. This carbon block is provided with the carbon cells 19 and is conductively connected with the terminal screw 20. Parallel to the face of the carbon cells is disposed a disc 21 as a movable electrode. This disc may be secured in a known manner to the rim of the box 16, and would perform only such oscillations as consist in a vibration of the center of the membrane. In the drawing the disc 21 is of a smaller diameter than the box 16, so that it is not clamped to the rim of the latter. The disc 21 is therefore absolutely free and may oscillate in a parallel sense without any deformation. The disc 21 is held by means of a socket 22, into which the coupling rod 14 is secured by means of a set screw. The carbon cells are filled with carbon balls, and form the microphone contact between the carbon block 18 and the disc 21. The electric connection to the disc 21 is formed by the bracket 25 for armature 6, the coupling rod 14 and the socket 22. The terminal screw 24 is arranged on one side of bracket 25. A number of hooks 26 may also be provided on the box 16 for holding or retaining the disc 21.

For limiting the stroke of the armature 6, the latter is provided with a rear support at its center. For this purpose a bridge 30 is disposed across the magnet system, the bases 31 of which bridge bear on the ears of the poleshoes 3. In the center of this bridge 30 is disposed a set screw 32 fitted with a pad 33 of an elastic material bearing against the armature 6. The object of this arrangement is to limit the stroke of the armature in case the armature should be forced by some outward force away from the poles of the magnet contrary to the action of the latter, as the carbon balls might in such case fall out from their cells, so that the whole device would become absolutely useless. The support 32 with its soft pad 33 has the further object of deadening the individual oscillation of the armature which may occur in some devices. For this purpose the set screw 32 is set in such a manner that its soft pad bears against the rear of the armature and thereby cushions the latter.

The device described operates in the following manner: The armature 6, which is supported by the hinge bearing on bracket 25 and the abutment bearing 10, or by two such abutment bearings, the same as a beam on two supports, is under uniform action of the magnetic field. The stiffness of the tongue 9 permits the armature, by a corresponding adjustment of the abutment 10, which may, according to circumstances have a hard or soft pad, to be approached to the smallest possible distance from the poles of the electromagnet without the armature being completely drawn up to the poles of the magnet. Thereby it is rendered impossible for the armature 6 to stick to the poles, which would cancel the action of the amplifying relay. On the other hand, this adjustability of the gap between armature and poles, rendered possible by a stiff and strong tongue 9, will greatly increase the sensitiveness of the amplifying relay, as the same increases by the square with the reduction of the said gap. Owing to the very small magnetizing forces of the current impulses to be amplified, this arrangement will admit of an extremely strong effect, by the armature answering, in consequence of its being set to the smallest gap possible, to the finest arriving electric oscillations, which are then transmitted to the movable electrode of the microphone. Thereby amplified electric oscillations are produced in the circuit into which the said microphone is connected.

The leads for the oscillations to be amplified are connected, see Fig. 8, to the terminals 5 of the magnet windings, 4. The microphone is connected at 20 and 24 into a circuit, which contains a battery 27 and an induction coil or transmitter 28. The current flows from the terminal 20 over the carbon block 18 and the carbon cells 19 to the disc 21, thence over the socket 22 and the coupling rod 14, the armature 6, the bearing at 7 and the bracket 25 to the terminal 24. From the other winding of the induction coil the leads 29 proceed for the amplified currents. For increasing the effect, several of these devices may be connected either in series or in multiple arc behind each other, the leads 29 in such case being connected to the terminals of the following amplifying relay.

What I claim and desire to secure by Letters Patent is:

1. In a device for amplifying telephone currents and other electric oscillations a polarized magnet system, the magnet field of which is varied by the electric oscillations, an elongated armature comprising a relatively thick and rigid portion disposed in front of the poles of said polarized magnet system and a relatively elastic portion at a greater distance from said poles, a bearing for said armature at each of its ends contrary to the action of the magnetic force of the polarized field, a transmitter, and a coupling of the movable electrode of the transmitter with the said armature, the connection of said coupling to the armature being closer to the point at which the magnetic force of said polarized magnet system acts than to one of the bearings of the armature.

2. In a device for amplifying telephone currents and other electric oscillations, a polarized magnet system, the magnetic field of which is varied by the electric oscillations, an armature disposed in front of the poles of said polarized magnet system, on the one end of the armature a hinge bearing, on the other end of the armature an elastic tongue, an abutment bearing against which the tongue of the armature bears contrary to the attraction of the magnet system, a transmitter, a coupling between the movable electrode of the transmitter and the said armature, the connection of said coupling to the armature being closer to the point at which the magnetic force of said polarized magnetic system acts than to said hinge bearing.

3. In a device for amplifying telephone currents and other electric oscillations, a polarized magnet system composed of a set of permanent magnets and two converging pole shoes on which the electromagnetic coils are fitted and through which the electric oscillations flow, an armature, disposed between said pole shoes and across the path of the lines of force of said magnet system, so that it fills the angle formed by the converging pole shoes and forms a very short bridge for the magnetic lines of force from one pole to the other, a hinge bearing at the one end of the armature, an elastic tongue on the other end of the armature, an abutment bearing against which the tongue of the armature bears contrary to the attraction of the magnet system, a transmitter, a coupling rod fitted at its one end to the movable electrode of the transmitter and at its other end to the said armature closer to the point at which the magnetic force of said polarized magnet system acts than to said abutment bearing.

4. In a device for amplifying telephone currents and other electric oscillations, a polarized magnet system, the field of which is varied by the electric oscillations, an armature disposed in front of the poles of said magnet system, a hinge bearing on one end of said armature, an abutment bearing against which a tongue on the other end of the armature bears contrary to the action of said magnet system, means for adjusting said abutment bearing for varying the gap between said armature and the magnet poles, a transmitter, and a coupling between the movable electrode of the transmitter and the armature of the magnet system connected to said armature closer to the point at which the force of said magnet system acts than to either of the bearings of said armature.

In testimony whereof I affix my signature in presence of two witnesses.

JOHANNES BLANKENBURG.

Witnesses:
 EDITH WURM,
 HERMANN PRINGLE